United States Patent [19]
Baehr

[11] Patent Number: 6,144,657
[45] Date of Patent: Nov. 7, 2000

[54] REMOTE DEVICE CONNECTION TO A NETWORK

[75] Inventor: Geoffrey A. Baehr, Palo Alto, Calif.

[73] Assignee: Sun Microsystems, Inc.

[21] Appl. No.: 08/964,151

[22] Filed: Nov. 6, 1997

[51] Int. Cl.$^7$ .................................................. H04L 42/66
[52] U.S. Cl. .......................................... 370/352; 370/354
[58] Field of Search .................................... 709/227, 228;
370/352, 353, 354, 355, 356, 389; 705/27;
379/88.17, 209, 215, 210, 211, 212; 455/564

[56] References Cited

U.S. PATENT DOCUMENTS

| | | | |
|---|---|---|---|
| 5,546,379 | 8/1996 | Thaweethai et al. . | |
| 5,805,587 | 9/1998 | Norris et al. ............................. | 370/389 |
| 5,953,676 | 9/1999 | Berry et al. .............................. | 455/564 |
| 5,982,774 | 11/1999 | Foladare et al. ......................... | 370/352 |
| 5,991,798 | 11/1999 | Ozaki et al. ............................. | 309/228 |

FOREIGN PATENT DOCUMENTS

| | | |
|---|---|---|
| 0 798 899 A1 | 10/1997 | European Pat. Off. . |
| WO 96/34341 | 10/1996 | WIPO . |
| WO 97/14234 | 4/1997 | WIPO . |

OTHER PUBLICATIONS

Yeom, Heon Y., et al., "IP Multiplexing by Transparent Port–Address Translator", 1996 LISA X–Sep. 29–Oct. 4, 1996—Chicago, IL, pp. 113–121.

Tsuchiya, Paul F., et al., "Extending the IP Internet Through Address Reuse", Computer Communication Review, pp. 16–33, Jan. 1993.

Messer Funderburk D. et al., "A High Performance DTMF Detection Method For Digital Telephone and Telecommunication Systems", Proceedings of the International Conference on Consumer Electronics (ICCE), Roesmont, Jun. 2–4, 1992, No. Conf. 11, pp. 200–201.

A.S. Tanenbaum, "Computer Networks", 1996, Prentice Hall PTR, Upper Saddle River, New Jersey, pp. 685–691.

*Primary Examiner*—Chi H. Pham
*Assistant Examiner*—Brenda H. Pham
*Attorney, Agent, or Firm*—Finnegan, Henderson, Farabow, Garrett & Dunner, L.L.P.

[57] ABSTRACT

A central site such as an Internet Service Provider (ISP) monitors information requests incoming from devices on a network such as the Internet. If the incoming information indicates that the services of a remote, off-line computer is required, the ISP signals the off-line computer via an out-of-band signal. In response to the signal, the off-line computer connects to the Internet through the ISP in its normal manner, and subsequently responds to the devices.

25 Claims, 3 Drawing Sheets

REMOTE DEVICE CONNECTION TO A NETWORK

BACKGROUND OF THE INVENTION

This disclosure relates generally to network connections, and more particularly, to the connection of remote devices, such as computers, to the Internet through Internet Service Providers.

The Internet is a world-wide network of many hundreds of thousands of computers connected through the TCP/IP protocol (Transmission Control Protocol/Internet Protocol). High bandwidth fiber optic transmission paths are the data carrying backbone of the Internet. Some Internet users are connected directly, or nearly directly, to the high capacity data lines. Other users are connected through slower, relatively low capacity telephone lines via dial-up modems over the telephone network.

Telephone line access to the Internet is often made with a modem dialing into an Internet Service Provider (ISP). FIG. 1 is a block diagram illustrating the relationship of an ISP to its dial-up users. ISP 101 is connected to Internet 102 via a relatively high speed data connection 104, and includes an in-bound call processing section 103, such as a modem bank. Remote computers 106a, 106b, and 106c are not permanently connected to the Internet, but may, at the user's option, dial into ISP 101.

ISP 101, when called by one of remote computers 106, such as computer 106a, answer's the call at in-bound call processing section 103 and negotiates a connection with computer 106a, such as the known Point-to-Point ("PPP") protocol connection. Once connected, remote computer 106a uses the TCP/IP protocol suite to communicate with other devices on the Internet.

To create an Internet connection, computers 106 must initiate the connection by dialing ISP 101. This connection method can be problematic when time sensitive information destined for one of remote computers 106 is received at ISP 101. For example, with the conventional connection method, e-mail received at ISP 101 from device 107 is unknown to the user until she polls her account, that is, until she dials in and checks her email account. Additionally, if remote computers 106 are used as a Web server, devices attempting to connect to the Web server will be unsuccessful unless the remote computer happens to be connected to ISP 101.

Thus, there is a need in the art to more efficiently connect remote computers to their ISPs.

SUMMARY OF THE INVENTION

It is an object of the present invention to provide 100% virtual connectivity to remote devices on a network without requiring the devices to be constantly in contact with the network.

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, an aspect of the present invention includes a method of connecting a first computer and a second computer via a network. The method comprises the steps of: (1) monitoring the network for a request from the second computer to access the first computer; (2) notifying the first computer of the request with an out-of-band signal; (3) discontinuing the out-of-band signal; (4) waiting for the first computer to initiate contact with the network; and (5) accepting a request by the first computer to connect to the network.

Additionally, a computer system consistent with the present invention comprises an out-bound processing circuit, a local domain name server, and an in-bound processing circuit. The local domain name server is configured to convert a mnemonic address lookup request to a corresponding IP address and to instruct the out-bound processing circuit to initiate an out-of-band connection with a remote computer when the mnemonic address lookup request is for the remote computer and the remote computer is presently off-line.

Still further, yet another aspect of the present invention includes a method of connecting a remote computer to the Internet. The method comprises the steps of: (1) receiving a command transmitted via a telephone line using dual tone multi-frequency (DTMF) signals, the command informing the remote computer that a device is attempting to contact the remote computer; (2) discontinuing reception of the DTMF signals; and (3) initiating contact with an Internet Service Provider in response to the received command.

It is to be understood that both the foregoing general description and the following detailed description are exemplary and explanatory only and are not restrictive of the invention, as claimed.

BRIEF DESCRIPTION OF DRAWINGS:

The accompanying drawings, which are incorporated in and constitute a part of this specification, illustrate several embodiments consistent with this invention and, together with the description, help explain the principles of the invention. In the drawings.

DETAILED DESCRIPTION

Methods and systems consistent with the present invention monitor, at a central site such as an Internet Service Provider (ISP), information incoming from devices on a network such as the Internet. If the incoming information indicates that the services of a remote, off-line computer are required, the ISP, or other central site, signals the off-line computer with an out-of-band signal. In response to the signal, the off-line computer connects to the Internet through the ISP in its normal manner, and subsequently responds to all requests for services or connections.

Reference will now be made in detail to the embodiments of the invention, examples of which are illustrated in the accompanying drawings. Wherever possible, the same reference numbers will be used throughout the drawings to refer to the same or like parts.

Figure 1:
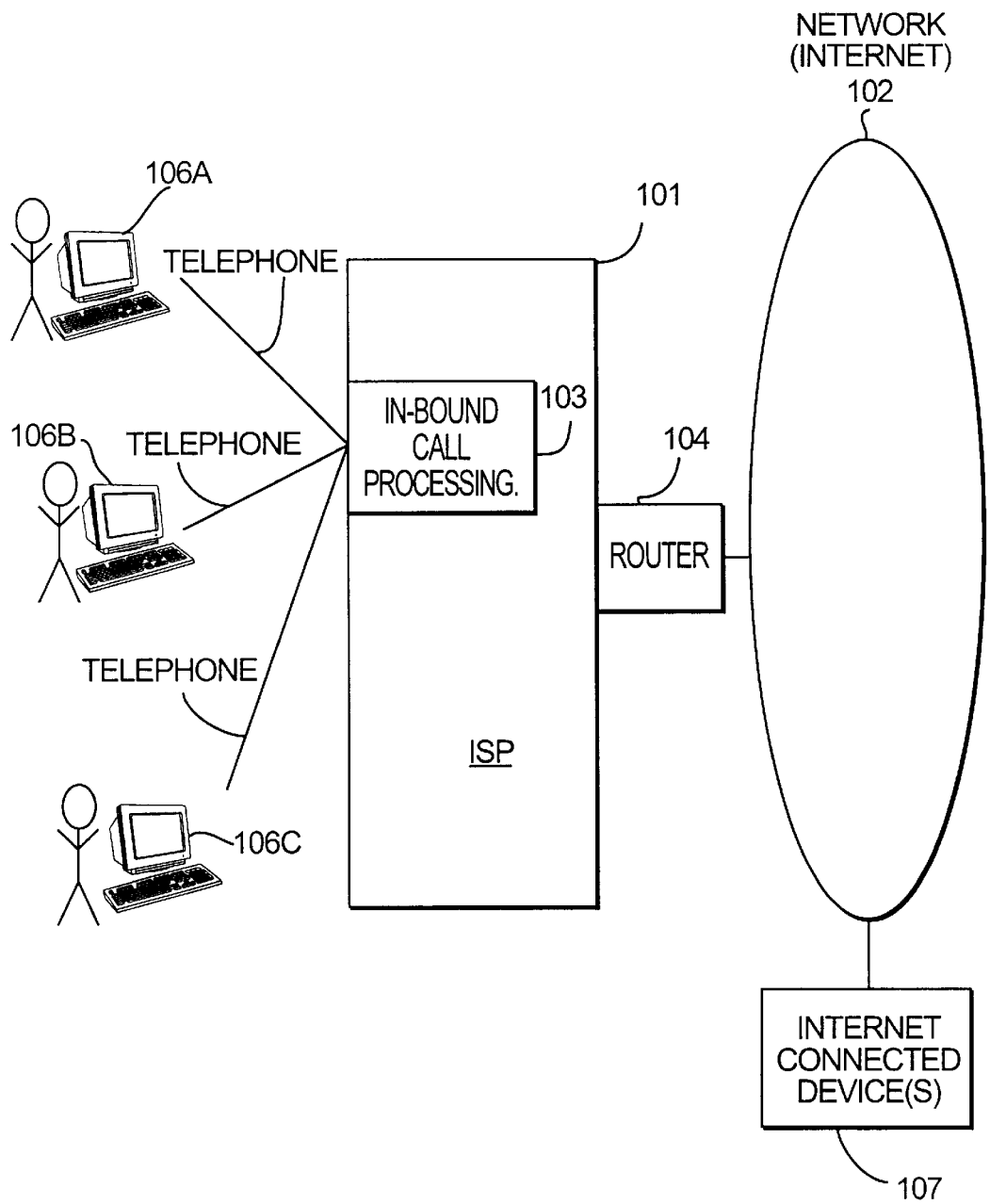
FIG. 1 is a block diagram illustrating a conventional arrangement between an Internet Service Provider and its dial-up remote computers.
Figure 2:
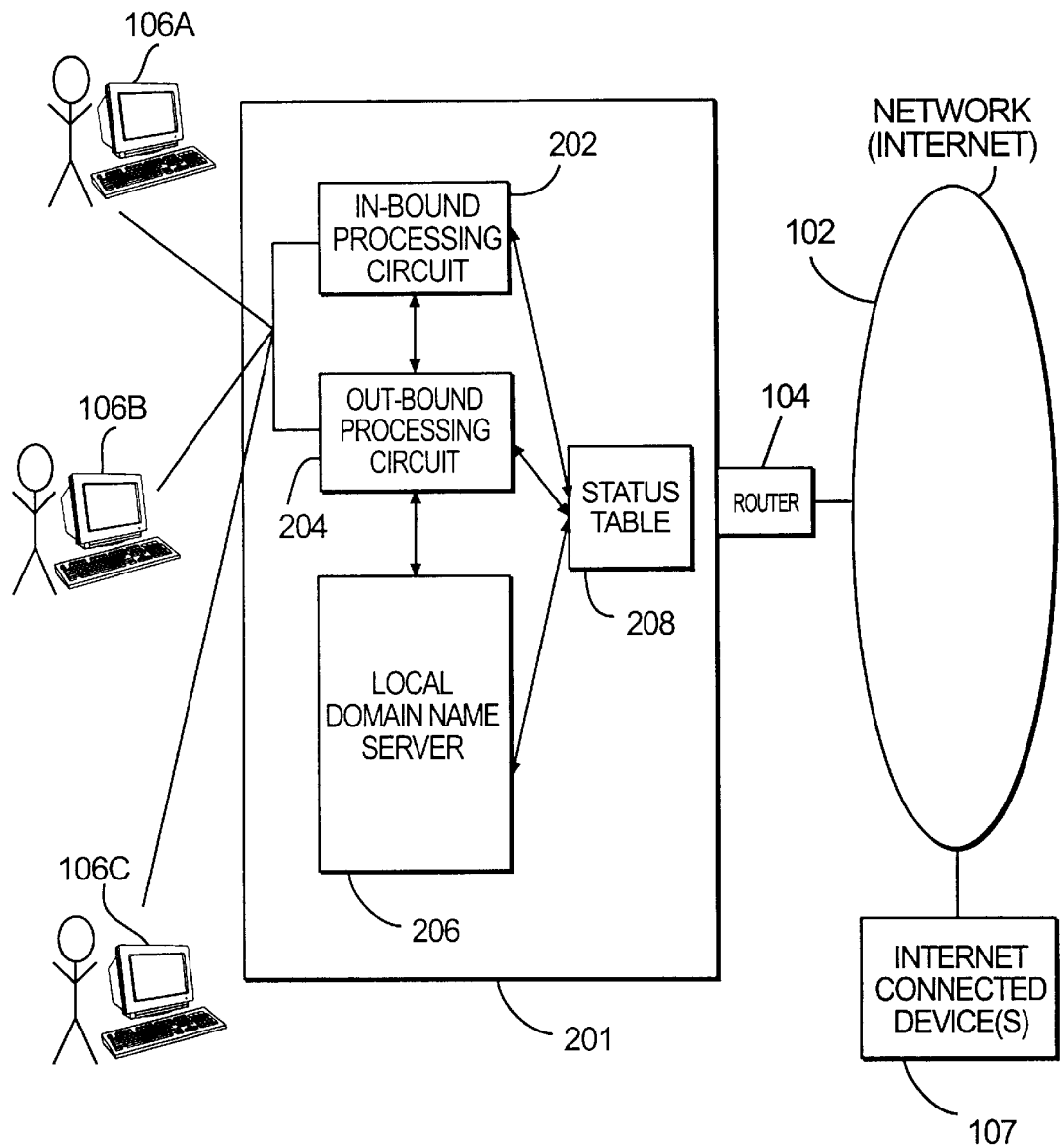
FIG. 2 is a block diagram of a computer system consistent with the present invention.

FIG. 2 is a conceptual block diagram of a computer system consistent with the present invention. Remote computers 106 connect to network 102 through ISP 201 in the conventional manner. In particular, ISP 201 receives telephone calls (or other appropriate connection requests) from remote computers 106 via in-bound processing circuit 202 and connects computers 106 with network 102. Signals traveling through the telephone network or through network 102 can generally be referred to as "carrier waves," which transport information.

Consistent with the present invention, ISP 201 additionally includes an out-bound processing circuit 204, such as a telephone dialing modem bank, a local domain name server 206, and a status table 208. Local domain name server 206 functions as a part of the Internet domain name system. The concepts of operation of domain name servers in the Internet's domain name system are known, however, for the reader's convenience, a brief summary of these concepts will now be further explained.

Internet addresses and domains are specified either as a mnemonic address such as "sun.com" or as a 32 bit, non-symbolic number representing the unique address of a device connected to the Internet. The mnemonic addresses exist for the convenience of humans, and are not used to in the actual routing of information packets. This is done solely with the 32 bit numeric address (the "IP address").

Before a computer, such as remote device 107, can contact a second computer, such as one of computers 106, it must first determine the correct recipient IP address. Mappings between mnemonic addresses and IP addresses are kept in a distributed database on the Internet called the domain name system. To obtain the correct IP address, remote device 107 queries the Domain Name System server with the mnemonic address and waits for the corresponding IP address to be returned. With the correct IP address in hand, remote device 107 can proceed to communicate with computer 106.

Figure 3:
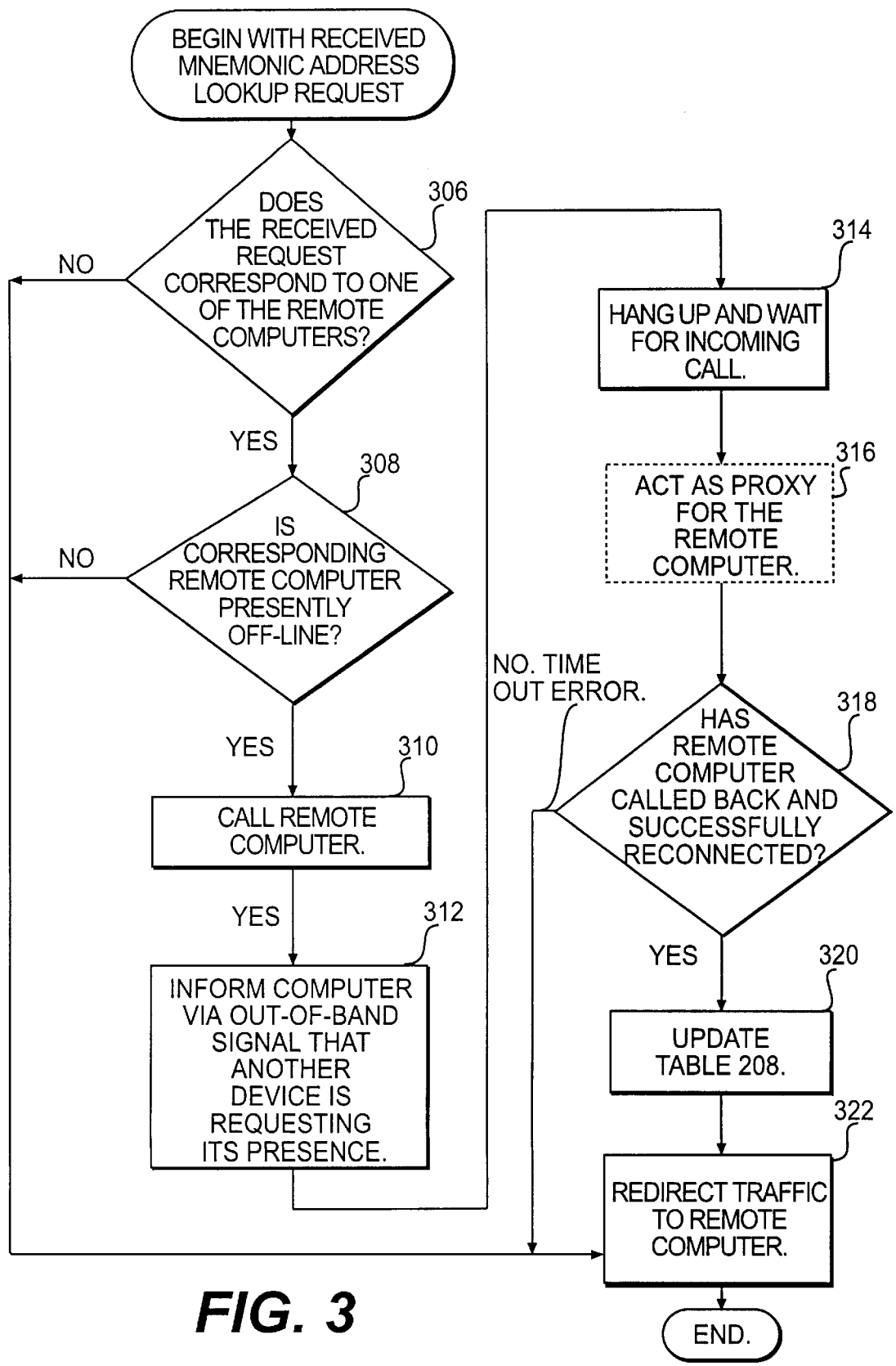
FIG. 3 is a flow chart illustrating the interaction of components of a computer system consistent with the present invention.

FIG. 3 is a flow chart illustrating the interaction of local domain name server 206, out-bound processing circuit 204, and status table 208, according to a method consistent with the present invention. When the domain name server 206 receives mnemonic address lookup requests from Internet 102, it checks whether the received address corresponds to one of the remote computers listed in table 208 (step 306), and whether the remote computer is already connected to ISP 201 (step 308). If the received request corresponds to an appropriate remote computer and the remote computer is presently off-line, domain name server 206 signals out-bound processing circuit 204 to call the remote computer. Out-bound processing circuit 204 initiates contact with the selected remote computer (step 310) using an out-of-band signal; that is, a signal not within the regular network signal. Appropriate out-of-band signals are, for example, a telephone call using DTMF coding or a radio frequency (RF) page.

When contact with the remote computer is made, out-bound processing circuit 204 informs the remote computer that it is being contacted by another device on the network (step 312). Preferably out-bound processing circuit 204 and the remote computer communicate with predesignated, five digit DTMF commands having an optional sixth digit indicating that the system would like to send an additional command. When a command ends without a sixth digit "more" indicator, out-bound processing circuit 204 and the remote computer terminate communication (step 314).

When the command sequence outlined above has completed, out-bound processing circuit 204 hangs up and in-bound processing circuit 202 waits for the remote computer to initiate a connection with the ISP in the usual manner (step 314). To prevent the device attempting to contact the remote computer over the Internet from giving up before the remote computer comes on line (a time out error), the system can optionally act as a proxy for the remote computer to respond in lieu of the remote computer (step 316).

If the remote computer calls back and successfully connects to the ISP, (step 318), the system updates table 208 to indicate that the remote computer is now connected (step 320), and redirects further traffic to remote computer (step 322). From this point on, the remote computer can freely communicate with other devices on the Internet until it disconnects from the ISP, at which time the system updates table 208.

Some ISPs assign IP addresses dynamically to remote devices as they come on-line. In this situation, when the remote computer is assigned its temporary address, the system notifies local domain name server 206, which accordingly updates its database. Any future new requests over the Internet for the connected remote computer are redirected by the system to the appropriate address. Additionally, any http requests (i.e., requests for Web page access) are redirected at the service layer via a server redirect to proceed directly to the remote device, thereby removing the domain name server from the communication path. Requests using other protocols, such as a file transfer protocol (ftp) request, may be similarly handled.

As noted above, table 208 correlates remote computers 106 with their connection status. Table I, below, is an exemplary instance of table 208. It includes, for example, a column identifying the particular remote computers, a column listing the connection status of the remote computer, and a column listing the phone number of the remote computer.

TABLE I

| Computer Name/Address | Connection Status | Phone Number |
| --- | --- | --- |
| Computer 1 | not connected | 202-555-1000 |
| Computer 2 | connected | 202-555-1212 |

Because remote computers 106 may go down or close connections suddenly, they may periodically notify the network of their presence. If no notification is received from a particular remote computer 106 for greater than a predetermined interval, table 208 is updated accordingly.

DTMF Protocol Description

As noted above, out-bound circuit 204 communicates with remote computers 106 via an out-of-band signal such as a DTMF signal. Preferably, the DTMF protocol is five characters long, plus an optional sixth tone indicating that a second five character command is to follow. The preferred meaning of the five tones are shown in Table II, below.

TABLE II

| Command |
| --- |
| First Tone (DTMF Digit Value) |

| | |
| --- | --- |
| 1 | Call Internet |
| 2 | Call Diagnostic Number for Service and/or Support |
| 3 | Call Alternate Number 1 |
| 4 | Call Alternate Number 2 |
| 5 | Call Alternate Number 3 |

TABLE II-continued

| | Command |
|---|---|
| 6 | Call Internet in N minutes, N = Tone 3 and 4 |
| 7 | Turn off audible ringing |
| 8–0 | Future reserved |
| | Second Tone (DTMF Digit Value) |
| 1 | Dump Status General to Diagnostic # |
| 2 | Dump Last Call Time to Diagnostic # |
| 3 | Dump Diag Statistics to Diagnostic # |
| 4–0 | Future reserved |
| | Third Tone (DTMF Digit Value) |
| | Call in N Tens of Minutes |
| | Fourth Tone (DTMF Digit Value) |
| | Call in N Minutes |
| | Fifth Tone (DTMF Digit Value) |
| 1 | Call Diagnostic # Once and Hangup |
| 2 | Call Diagnostic # and Prepare for Authentication Sequence for Reboot. |
| 3 | Call Diagnostic # and Prepare for Authentication Sequence to Change Call Number |
| 4 | Call Diagnostic # and Emit Status String Via DTMF |
| 5–0 | Future reserved |
| | Sixth Tone (DTMF Digit Value) |
| Digit # | Another Five Tone Command Sequence Will Follow |

As discussed above, methods and system consistent with the present invention allow a normally off line remote computer to be automatically connected whenever its presence is required. The invention is particularly advantageous as it can be implemented with relatively little modification to existing TCP/IP infrastructure, such as the hardware and software at a typical ISP.

Although the foregoing systems and methods have been described with reference to the Internet network with access provided through a dial-up protocol with local ISPs, other networks and network connection methods may be used. In general, the present invention may be used with any network through which remote devices may be intermittently connected.

While there has been illustrated and described what are at present considered to be preferred embodiments and methods of the present invention, it will be understood by those skilled in the art that various changes and modifications may be made, and equivalents may be substituted for-elements thereof without departing from the true scope of the invention. For example, while the above described remote computers have been illustrated as connecting to the ISP via telephone lines, the remote computer could connect to its ISP through other data carriers, such as: ISDN lines, cable modem lines, or wireless connections such as RF modems.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method of connecting an off-line computer and an on-line computer via a network, the method comprising the steps of:

monitoring the network for a request from the on-line computer to access a second computer;

determining that said second computer is off-line;

notifying the second computer of the request via a signal, provided the second computer is off-line;

discontinuing the signal;

waiting for the off-line computer to initiate contact with the network; and accepting a request by the off-line computer to connect to the network.

2. The method of claim 1, wherein the notifying step includes the substep of notifying the second computer with a DTMF signal, provided the second computer is off-line.

3. The method of claim 1, wherein the step of accepting a request by the off-line computer includes the substep of assigning the off-line computer an IP address.

4. The method of claim 3, further including the step of updating a domain name server with the assigned IP address of the off-line computer.

5. The method of claim 1, wherein the step of monitoring the network further includes monitoring the network for domain name lookup requests.

6. The method of claim 1, wherein the step of waiting for the off-line computer to initiate contact with the network includes the substep of acting as a proxy for the off-line computer.

7. The method of claim 1, wherein the step of notifying the second computer includes the step of signaling the second computer with an out-of-band command signal, provided the second computer is off-line.

8. The method of claim 7, wherein the step of notifying the second computer further includes the step of using the command signal to indicate that the second computer should call a specified diagnostic number for service or support.

9. The method of claim 7, wherein the step of notifying the off-line computer further includes using the command signal to indicate that the off-line computer should call back in N minutes, where N is a positive integer.

10. A computer readable medium containing instructions for causing a computer at a Network Service Provider that provides access to a network to perform the steps of:

monitoring the network for a request from an on-line computer system to access a second computer system;

determining that said second computer is off-line;

notifying the second computer system of the request via a signal, provided the second computer is off-line;

discontinuing the signal;

waiting for the off-line computer system to initiate contact with the network; and accepting a request by the off-line computer to connect to the network.

11. A computer data signal embodied in a carrier wave and representing sequences of instructions which, when executed by a computer system at a Network Service Provider, causes said computer system to perform the steps of:

monitoring a network for a request from an on-line computer system to access a second computer system;

determining that said second computer is off-line;

notifying the second computer system of the request via a signal, provided the second computer is off-line;

discontinuing the signal;

waiting for the off-line computer system to initiate contact with the network; and accepting a request by the off-line computer to connect to the network.

12. A computer system comprising:

an out-bound processing circuit configured to initiate an out-of-band connection with off-line computers;

a local domain name server configured to convert a mnemonic address lookup request to a corresponding IP address, to determine if the computer associated with the IP address is off-line and to instruct the out-bound processing circuit to initiate an out-of-band connection with the off-line computer when the mnemonic address lookup request is for the off-line computer; and an in-bound processing circuit configured to receive connection requests from the off-line computer in response to the out-of-band connection.

13. The computer system of claim 12, further including a status table holding phone numbers and connection status information relating to the remote computers.

14. A method of connecting an off-line computer to a Network, the method comprising the steps of:

receiving a command by an off-line computer, the command informing the off-line computer that a device is attempting to contact the off-line computer;

discontinuing reception of the transmission signals; and initiating contact with a Network Service Provider that provides access to a network in response to the received command.

15. The method of claim 14, further including the step of communicating with the device through the Network Service Provider.

16. The method of claim 14, further including the substep of dialing into the Network Service Provider via a dial-up connection.

17. The method of claim 14, wherein the step of initiating contact is performed N minutes after the command is received, where N is a positive integer and is specified by the command.

18. A computer readable medium containing instructions for causing an off-line computer to connect to a network by causing the off-line computer to perform the steps of:

receiving a command by an off-line computer, the command informing the off-line computer that a device is attempting to contact the off-line computer;

discontinuing reception of the transmission signals; and initiating contact with a Network Service Provider that provides access to a network in response to the received command.

19. The computer readable medium of claim 18, further including instructions causing the off-line computer to communicate with the device through the Network Service Provider.

20. The computer readable medium of claim 18, further including instructions causing the off-line computer to dial into the Network Service Provider via a dial-up connection.

21. The computer readable medium of claim 18, further including instructions causing tile off-line computer to perform the step of initiating contact N minutes after the command is received, where N is a positive integer and is specified by the command.

22. A computer data signal embodied in a carrier wave and representing sequences of instructions which, when executed by an off-line computer, causes the off-line computer to perform the steps of:

receiving a command by an off-line computer, the command informing the off-line computer that a device is attempting to contact the off-line computer;

discontinuing reception of the transmission signals by the off-line computer; and initiating contact with a Network Service Provider that provides access to a network in response to the received command.

23. The computer data signal of claim 22, further causing the off-line computer to perform the step of communicating with the device through the Network Service Provider.

24. The computer data signal of claim 22, further causing the off-line computer to perform the step of dialing into the Internet Service Provider via a dial-up connection.

25. The computer data signal of claim 22, further causing the off-line computer to perform die step of initiating contact N minutes after the command is received, where N is a positive integer and is specified by the command.

* * * * *

UNITED STATES PATENT AND TRADEMARK OFFICE
CERTIFICATE OF CORRECTION

PATENT NO.   : 6,144,657

DATED        : November 7, 2000

INVENTOR:    : Geoffrey A. BAEHR

It is hereby certified that errors appear in the above-identified patent and that said Letters Patent is hereby corrected as shown below:

On the Title Page, Item [73], in the Assignee, after "Sun Microsystems, Inc.", insert --, Palo Alto, California--.

In Claim 21, col. 8, line 14, "tile off-line computer" should read --the off-line computer--.

In Claim 25, col. 8, line 38, "die step" should read --the step--.

Signed and Sealed this

Twenty-second Day of May, 2001

Attest:

NICHOLAS P. GODICI

*Attesting Officer*    *Acting Director of the United States Patent and Trademark Office*